United States Patent [19]
Hoagland

[11] Patent Number: 5,972,280
[45] Date of Patent: Oct. 26, 1999

[54] PNEUMATIC EMBOSSING

[75] Inventor: John C. Hoagland, Longmeadow, Mass.

[73] Assignee: Solutia Inc., St. Louis, Mo.

[21] Appl. No.: 09/046,277

[22] Filed: Mar. 23, 1998

[51] Int. Cl.$^6$ ............... B29C 59/02; B29C 59/04; B29C 59/00

[52] U.S. Cl. .............. 264/555; 264/284; 425/326.1; 425/374

[58] Field of Search ................ 264/509, 555, 264/284, 504, 556; 425/326.1, 374

[56] References Cited

U.S. PATENT DOCUMENTS

| | | |
|---|---|---|
| 3,157,723 | 11/1964 | Hochberg ............... 264/284 |
| 3,535,740 | 10/1970 | Frowde . |
| 4,671,913 | 6/1987 | Gen et al. ............... 264/171 |
| 5,211,903 | 5/1993 | Reifenhauser ............... 264/555 |

*Primary Examiner*—Jan H. Silbaugh
*Assistant Examiner*—Michael Poe
*Attorney, Agent, or Firm*—Michael J. Murphy

[57] ABSTRACT

A method of embossing thermoplastic sheet by continuously advancing thermoplastic sheet through an embossing nip defined by a rotating embossing roll with an engraved surface at elevated embossing temperature and an opposite fixed rigid concave member and pneumatically forcing the sheet against the engraved surface while within and continuously passing through the nip.

7 Claims, 3 Drawing Sheets

PNEUMATIC EMBOSSING

BACKGROUND OF THE INVENTION

This invention relates to an embossing process for imparting a textured surface to heat shapable thermoplastic sheet.

Systems are well established for passing thermally softened thermoplastic sheet through a nip formed by a rotating metal embossing roll having an engraved surface pattern and an opposing rubber-faced backup roll to press the sheet by rubber compression against the embossing roll and imprint the sheet with the pattern. At commercial line speeds the residence time of the sheet against the engraved surface in these systems is relatively short.

Polyvinyl butyral (PVB) sheet for laminated safety glass is representative of sheet provided with a textured surface in processes of the type described. Note, for example, U.S. Pat. No. 5,455,103 to Hoagland et al for disclosure of such a system in the Examples. The rough, textured surface provides channels between glass layers and the PVB sheet for air removal during formation of the layered safety glass which then is conventionally removed by melting the surface smooth during elevated temperature laminating. At commercially economical sheet line processing speeds, it is difficult in the embossing nip to impart a rough surface to such sheet which is sufficiently deep and permanent to accommodate deairing during glass laminating. Moreover, significant compression of the rubber of the backup roll operating at elevated temperature encountered in the embossing nip causes relatively rapid deterioration of the rubber after short operating intervals.

It would be desirable to provide an embossing process for heat shapable thermoplastic sheet which avoids or minimizes problems encountered in prior art embossing systems.

SUMMARY OF THE INVENTION

Now improvements have been made in processes for embossing thermoplastic sheet which avoid shortcomings of prior art systems.

Accordingly, a principal object of this invention is to provide an improved process for embossing thermoplastic sheet, particularly PVB sheet.

Other objects will in part be obvious and will in part appear from the following detailed description and claims.

These and other objects are accomplished by a method of embossing thermoplastic sheet which comprises continuously advancing thermoplastic sheet at elevated embossing temperature through an embossing nip defined by a rotating embossing roll with an engraved surface at elevated embossing temperature and an opposite fixed rigid concave member and pneumatically forcing the sheet against the engraved surface while within and continuously passing through the nip.

BRIEF DESCRIPTION OF THE DRAWINGS

In describing the overall invention, reference will be made to the accompanying drawings wherein.

DETAILED DESCRIPTION OF THE INVENTION

Figure 1:
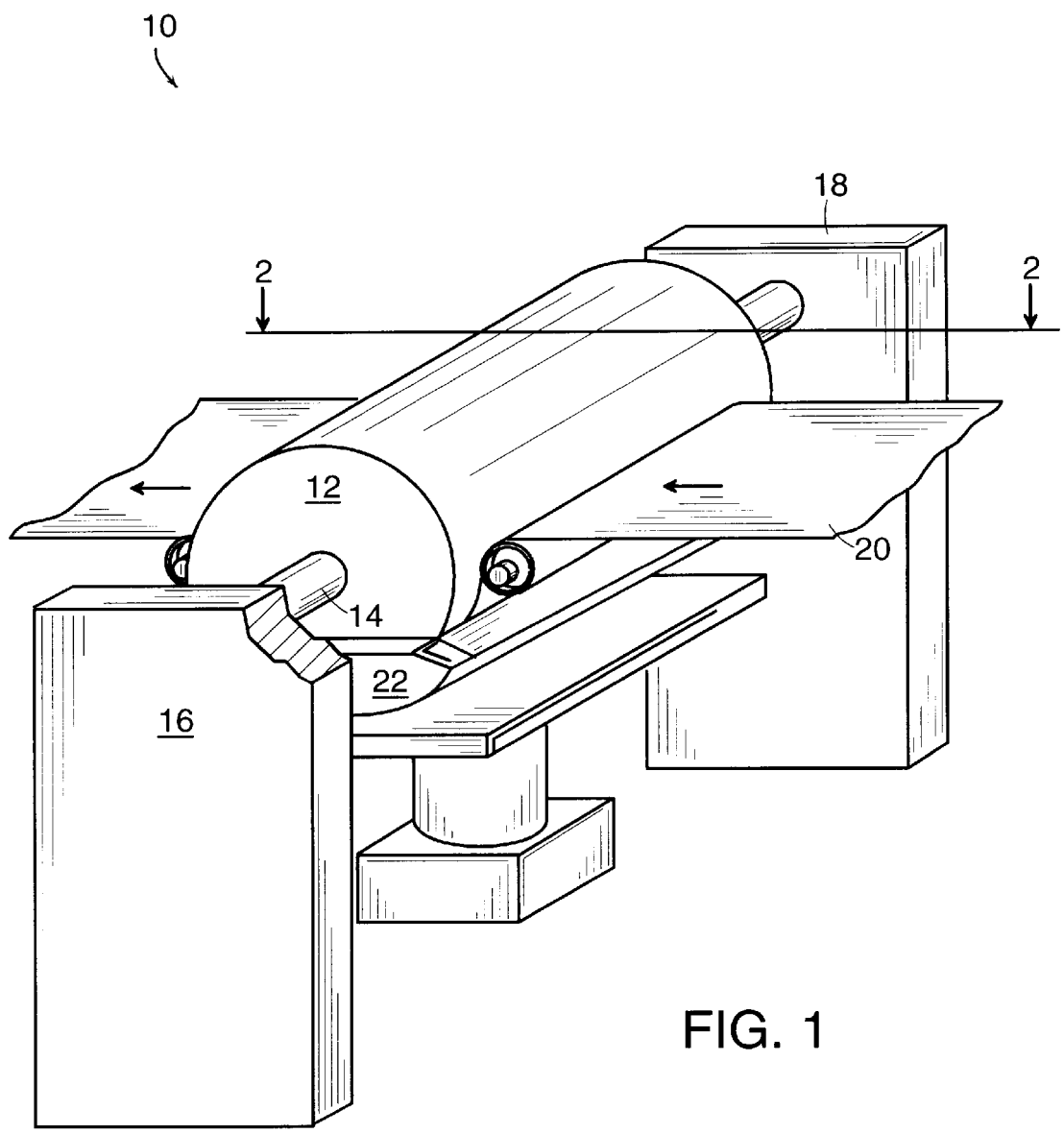
FIG. 1 is a three dimensional view of embossing apparatus usable in the process of the invention.

Referring to the drawings, apparatus 10 for embossing thermoplastic sheet 20 comprises elongated, cylindrical embossing roll 12 mounted for rotation about axis 14 by means of conventional bearing members, not shown, in upright supports 16, 18. In a manner to be described, the cylindrical surface of roll 12 has an engraved pattern which imparts to the surface of sheet 20 a textured pattern which is the reverse of that on the roll surface—i.e. raised protrusions of the engraved surface form a correspondingly configured depressed imprint in the sheet surface. The configuration of the engraved surface varies with the particular embossed pattern being imprinted on the thermoplastic sheet. A form of such pattern is described in U.S. Pat. No. 5,455,103 to Hoagland et al, the content of which is incorporated herein by reference. The engraved surface of roll 12 is thermally controlled, preferably at a temperature adequate to raise the temperature of the surface and at least a portion of the thickness adjacent the surface of unheated sheet 20 to elevated shaping temperature above its softening point as it passes through apparatus 10 in a manner to be described. This is done by continuously circulating a suitable heat transfer medium through roll 12 in a conventional manner, not shown.

Fixed rigid member 22 having a concave surface 24 (FIGS. 2 and 3) matching the cylindrical surface of roll 12 is opposite and closely adjacent roll 12 to define with roll 12 an extended embossing nip which in arcuate extent is up to 75% of the cylindrical periphery of roll 12. The embossing nip is narrow (in the direction of arrow P in FIG. 2) chamber 26 of about 0.001 to 1.5 inch (0.00254 to 5.81 cm), preferably 0.006 in (0.015 cm) width between roll 12 and concave surface 24 of rigid member 22. Chamber 26 in the direction parallel to axis 14 does not exceed and is essentially (85 to 98%) equal to the width of sheet 20.

Member 22 has a plurality, typically three, of ports 28 equally spaced from each other along its length on each side of axis 14 which communicate through flexible hoses 30 with a pneumatic pressure source, schematically illustrated as blower 32, capable of providing air at about 1 to about 100 psig, preferably about 15 to 30 psig. The air fed to chamber 26 can vary in temperature from room to 66° C. and is preferably between 27 to 38° C.

Figure 2:
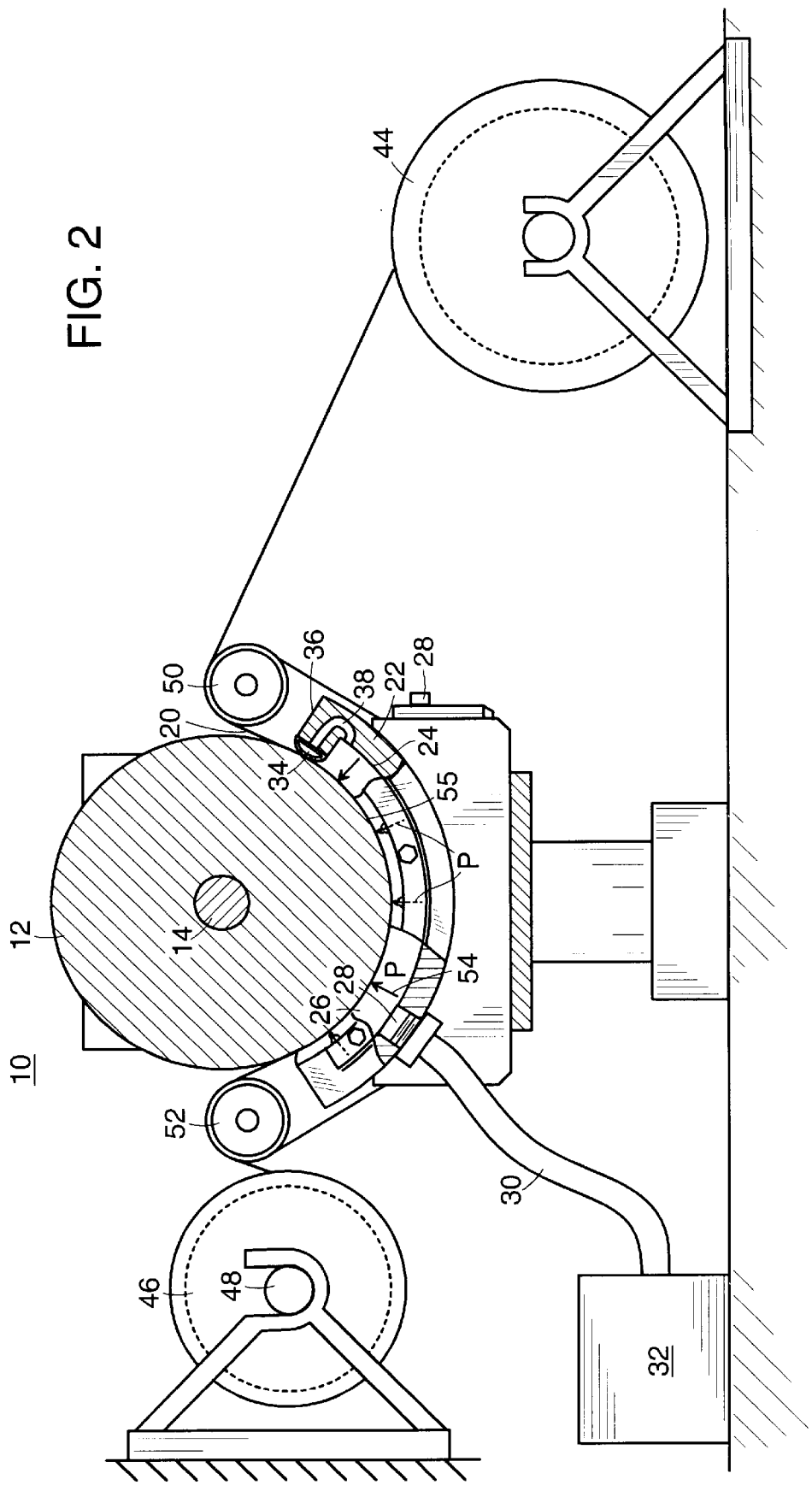
FIG. 2 is a vertical, sectional view along 2—2 in FIG. 1.
Figure 3:
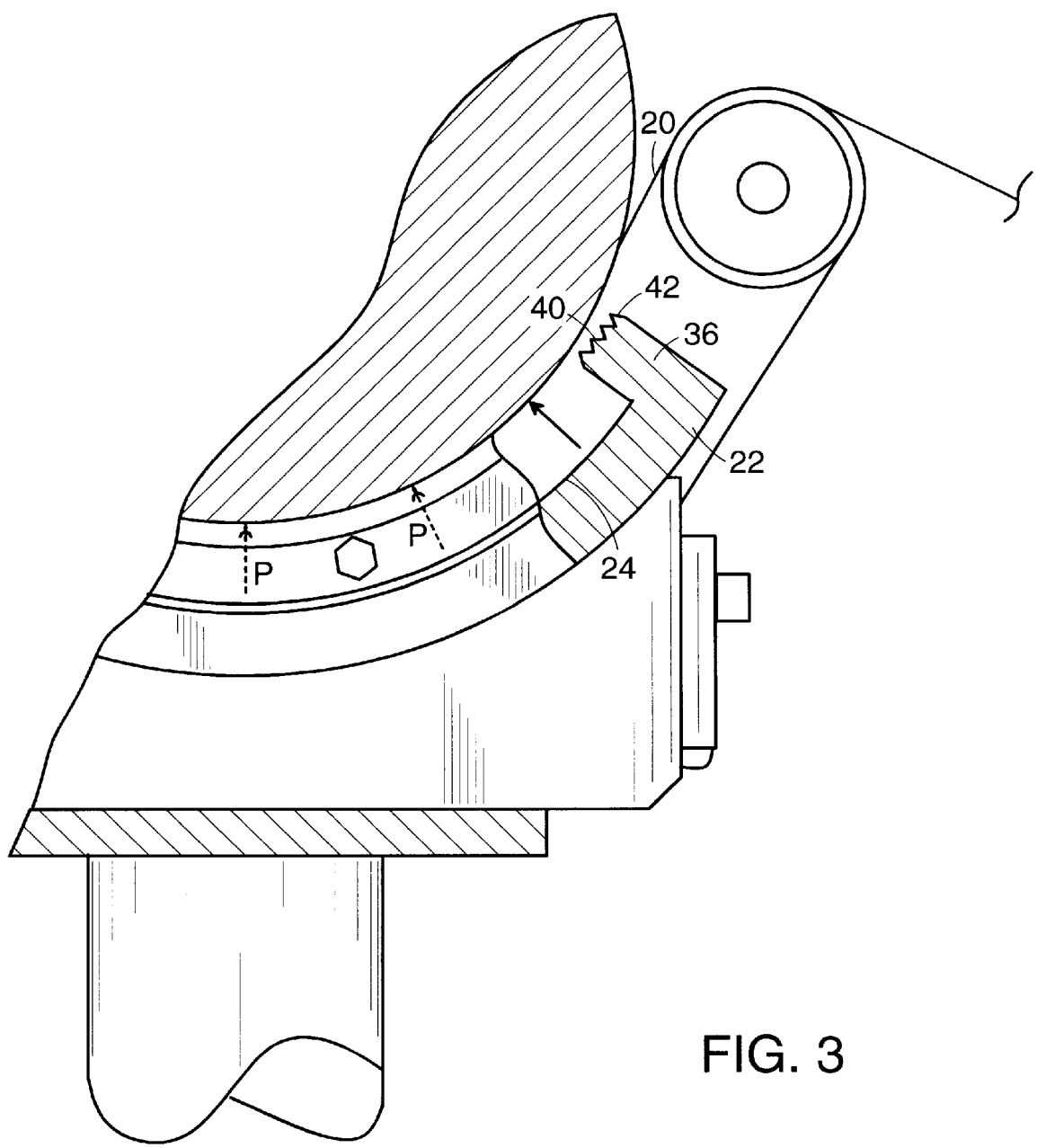
FIG. 3 is a partial, sectional, schematic view of an alternative form of seal for the apparatus of FIGS. 1 and 2.

Four seals 34 are mounted to member 22 and extend along each longitudinal edge (e.g. 36 in FIG. 2) parallel to axis 14 and along each end perpendicular to edge 36, not shown. Seals 34 are of resilient elastomer capable as shown in FIG. 2 of inflating toward sheet 20 under the influence of air pressure from chamber 26 entering the interior of seal 34 through a plurality of passages 38 formed along the length of rigid member 22. Pneumatic pressure imposed on the underside of the resilient member of seal 34 urges it toward sheet 20. The extent of inflation of the sealing surface toward the sheet is controlled by the air pressure and choice of material of the elastomer. An alternative labyrinth form of seal is shown at 40 in FIG. 3 which comprises plural rows of V shaped projections extending toward sheet 20 along edge 36 of member 22.

In operation, a method is provided for embossing a continuous web of thermoplastic sheet 20 which comprises continuously advancing such sheet through the extended embossing nip formed by chamber 26 which is delimited on one side by the engraved rotating surface of embossing roll 12 and on the opposite side by concave surface of fixed rigid member 22. Roll 12 is turning in a clockwise direction, typically at about 5 to 100 rpm, by means of a suitable conventional drive means operatively coupled to shaft 14, not shown. Sheet 20, optionally at elevated temperature, is supplied by unwinding from unembossed upstream roll 44 (FIG. 2) and accumulated as roll 46 of embossed sheet downstream of apparatus 10. Pulling movement of sheet 20 through apparatus 10 is by conventional sheet-advancing apparatus known to those skilled in the art, such as an electrically powered winder assembly rotatably associated with core 48 of downstream roll 46. Cylindrical guide rolls 50,52 on each side of the embossing nip respectively guide unembossed sheet into and the embossed sheet away from the nip toward roll 46. Roll 50 ahead of chamber 26 positions the sheet for introduction to the chamber tangentially to roll 12 at a point 0 to 10 degrees ahead of upstream air seal 34.

Instead of continuously issuing from roll 44 as in FIG. 2, the sheet instead may be directed to apparatus 10 as extrudate from an upstream melt extruder having a die on its discharge end configured to shape thermoplastic melt into sheet form and set the thermoplastic.

According to the invention, and as shown in FIG. 2, once within the extended embossing nip the sheet is forced in the direction of arrow 54 against the hot engraved surface of rotating embossing roll 12 by static pressure P within chamber 26. The sealing surfaces of inflated seals 34 (both upstream and downstream and along each side parallel to the direction of advancing movement of the sheet) are typically spaced 0.002 to 0.20 in (0.05 to 0.5 mm) away from the underside 55 of sheet 20 not contacting the embossing roll. Thus, while close to the sheet, these sealing surfaces do not contact the sheet leaving a gap of the noted dimension (not shown in the drawings) between the sheet and the sealing surface. The seals retain pressurized air within chamber 26 while allowing a small flow of air to continuously leak through the gap between the sheet and the sealing surfaces of the four seal members. Air in chamber 26 impinges directly on underside 55 of sheet 20. The engraved surface of internally heated roll 12 is at elevated temperature above the softening temperature of the thermoplastic forming sheet 20. For thermoplastic sheet which can be embossed with the system of the invention, this temperature of the embossing surface is typically about 110 to about 270° C. When sheet 20 is of polyvinyl butyral, such softening temperature is about 150° C. Contact of sheet 20 while in the embossing nip with such engraved surface at elevated temperature conductively increases the sheet temperature above its softening point. Under the influence of the embossing pressure in chamber 26 forcing the sheet against roll 12 with atmospheric pressure on the other side the engraved pattern of the embossed surface is imparted to the softened thermoplastic of the sheet. The absence of any member (other than pneumatic pressure) contacting the underside 55 of sheet 20 while in the embossing nip avoids unwanted disruption of the fragile, heat softened thermoplastic of the sheet. When the preferred PVB material as a single layer is about 0.030 in (0.71 mn) thick, sheet is typically advanced through apparatus 10 at about 10 to 300 fpm (3 to 90 mpm). With unheated 0.030 in. thick PVB sheet supplied to the embossing nip at about 20 fpm with the pressure in chamber 26 about 30 psig and the embossing roll surface about 180° C., the bulk temperature of the sheet in the nip, taking into account that only one surface is being heated therein, is between about 40 to 260° C., particularly 40 to 180° C.

After exiting the nip to ambient temperature surroundings, the embossed sheet passes over downstream guide roll 52 and is wound into embossed sheet roll 46. Suitable conventional means, not shown, between the nip and roll 46 can forcibly quickly cool and set the soft thermoplastic of the embossed sheet rather than relying on ambient air conditions. An air knife between and above guide roll 52 and roll 46 directing chilled air against the embossed sheet is exemplary of an optional sheet cooling means.

If desired, roll 46 can be moved upstream of apparatus 10 and the sheet unwound and again advanced through apparatus 10 to emboss the other side opposite and without damage to the side embossed in the first pass. Alternatively, a second embossing station identical to and downstream of that described can be used to emboss the second side of the sheet.

In comparison with prior art systems employing a rubber-faced backup roll, the process described greatly increases the time interval during which the thermoplastic sheet is pressed against the engraved surface in the extended embossing nip. This increased embossing time importantly permits increasing the speed of the embossing processing line in proportion to the time difference between the two methods. Fatigue failure of rubberized backup roll surface is avoided to extend the expected operating life of the components of the disclosed system. Due to the film of air between the sheet and the seals, friction between the sheet and the four chamber seals is very low. Therefore sheet low in strength (low modulus of elasticity) can be successfully embossed since not subject to drag during embossing. The increased time in contact with the embossing roll facilitates providing a relatively deep textured pattern in the sheet surface. This offsets any loss in the pattern during a later heating step associated with incorporating textured PVB sheet into a finished article, such as an interlayer between two sheets of glass in forming a safety glass laminate.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

I claim:

1. A method for embossing thermoplastic sheet which comprises:

continuously advancing thermoplastic sheet through an extended embossing nip defined by a sealed chamber delimited on one side by a rotating embossing roll with an engraved surface at an elevated embossing temperature and on an opposite side by a fixed rigid concave member; and pneumatically forcing the sheet against the engraved surface while within and continuously passing through the nip by pressurized air within the chamber impinging on the side of the sheet opposite the side contacting the engraved surface to emboss the thermoplastic sheet with a pattern corresponding to the engraved surface of the embossing roll.

2. The method of claim 1 wherein the chamber is about 0.001 to 1.5 inches wide between the rotating embossing roll and the surface of the concave member.

3. The method of claim 1 wherein the pressure of the air is about 2 to 100 psig.

4. The method of claim 1 wherein during embossing, air continuously leaks from the nip through a gap between the sheet and a seal component of the concave member.

5. The method of claim 2 wherein the chamber peripherally surrounds up to 75% of the circumference of the embossing roll.

6. The method of any of claims 1, 2, 3, 4 or 5 wherein the thermoplastic sheet is a single layer comprising polyvinyl butyral.

7. The method of claim 6 wherein the bulk temperature of the sheet in the nip is between about 40 to 260° C.

* * * * *